Figure 2:
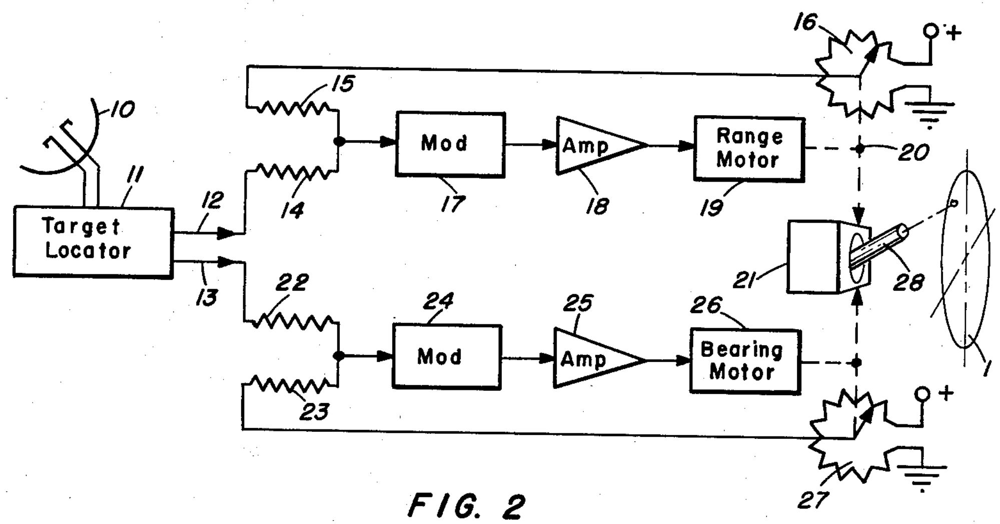

Feb. 11, 1964 C. L. VAN INWAGEN, JR 3,121,226
TARGET INDICATING SYSTEMS
Original Filed Sept. 22, 1953 3 Sheets-Sheet 1
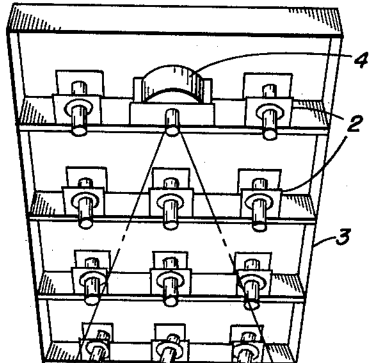
FIG. 1
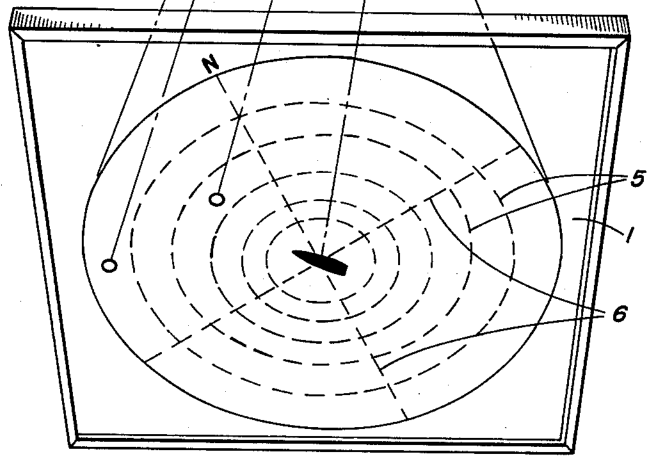
FIG. 6
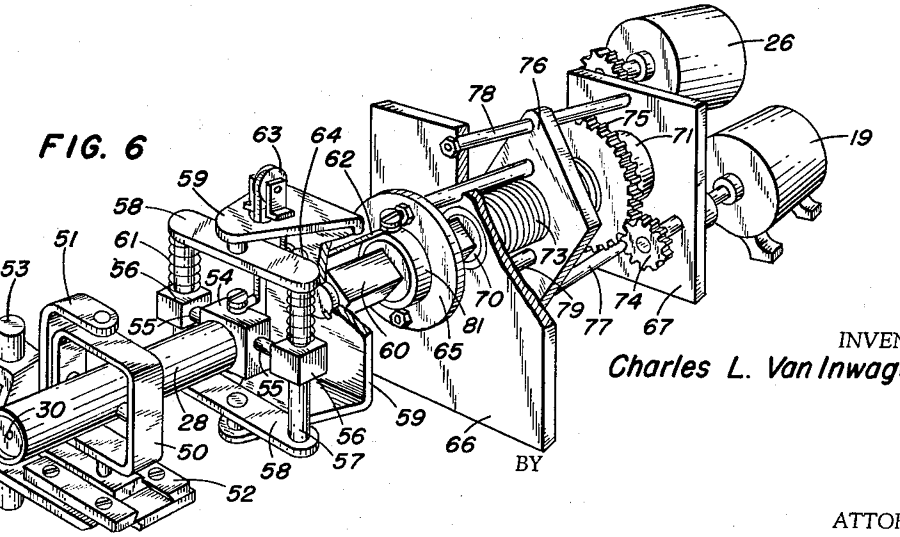
INVENTOR
Charles L. Van Inwagen, Jr.
BY
ATTORNEY Feb. 11, 1964 C. L. VAN INWAGEN, JR 3,121,226

TARGET INDICATING SYSTEMS

Original Filed Sept. 22, 1953 3 Sheets-Sheet 2

Feb. 11, 1964 C. L. VAN INWAGEN, JR 3,121,226

TARGET INDICATING SYSTEMS

Original Filed Sept. 22, 1953 3 Sheets-Sheet 3

United States Patent Office 3,121,226

Patented Feb. 11, 1964

3,121,226

TARGET INDICATING SYSTEMS

Charles L. Van Inwagen, Jr., Rutherford, N.J., assignor, by mesne assignments, to the United States of America as represented by the Secretary of the Navy Original application Sept. 22, 1953, Ser. No. 382,507. Divided and this application Mar. 22, 1957, Ser. No. 652,329

1 Claim. (Cl. 343—10)

This invention relates to target indicating systems and is particularly directed to synthesize by spots of light on a viewing screen the bearing, range and other information of a plurality of targets within a battle area with respect to a point in or near that area. The targets may be stationary installations or movable vehicles, friend or foe, such as gun placements, surface ships or airplanes, the locations of each of which can be determined by optical means, or by radar.

This application is a divisional application of copending U.S. patent application Serial No. 382,507, filed September 22, 1953, and now U.S. Patent No. 3,016,791.

Efficient dispatching of defensive forces often depends on a comprehension of the deployment of the enemy targets. Where a large number of fast moving targets are involved and where the defensive guns and interceptor equipment may be limited it is particularly important that the command quickly and accurately distinguish the more dangerous enemy targets from the less dangerous. Individual evaluation of the position and motion of each enemy target may be disastrously-slow in a highly mobile military pattern.

An object of this invention is a system for accurately presenting on a screen pictorial information concerning the position and movement of each of a plurality of targets.

Another object of this invention is a system of light beam projectors each of which can point to all points on a screen to represent two-dimensional information received concerning the target.

A still further object of this invention is a plurality of light beam projectors which can be directed to all points on a screen and which will additionally depict information such as range rate, elevation, and type of target.

A still more specific object of this invention is an improved light beam projector which when displaced from the perpendicular center line of a screen will locate a spot of light on the screen in response to target positional information received without distortion of the information.

Figure 5:
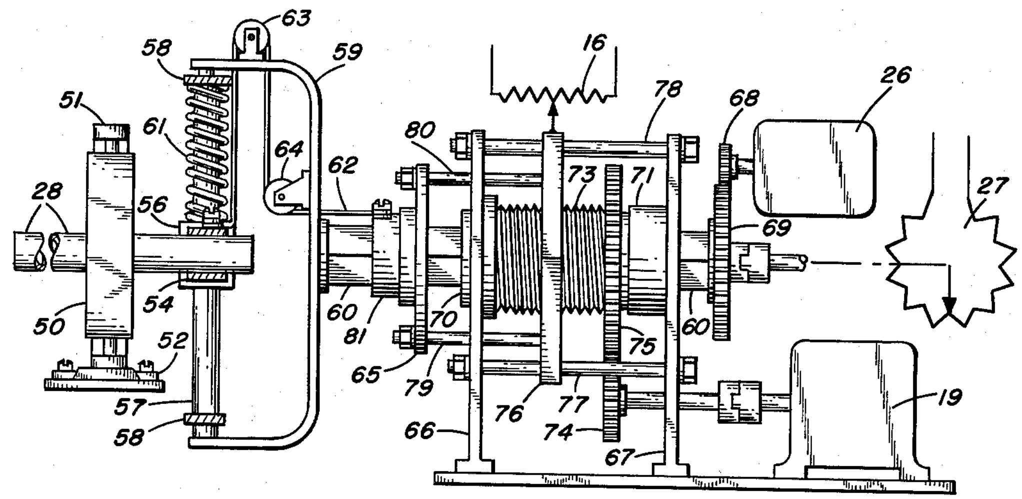
Figure 3:
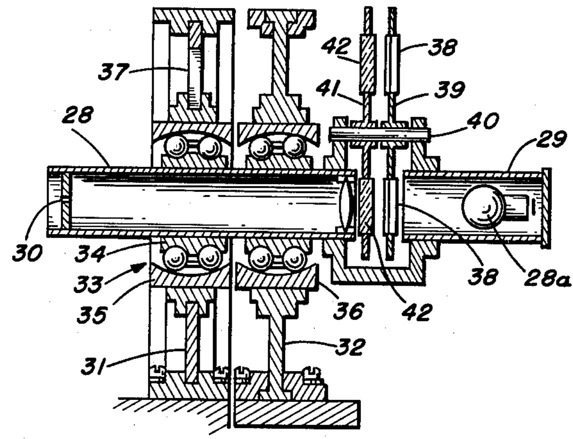
Figure 4:
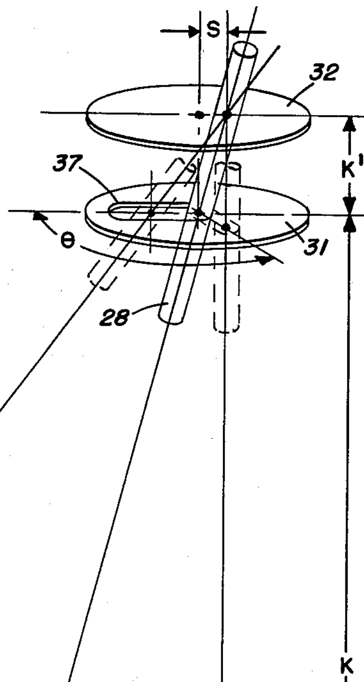
Figure 4:
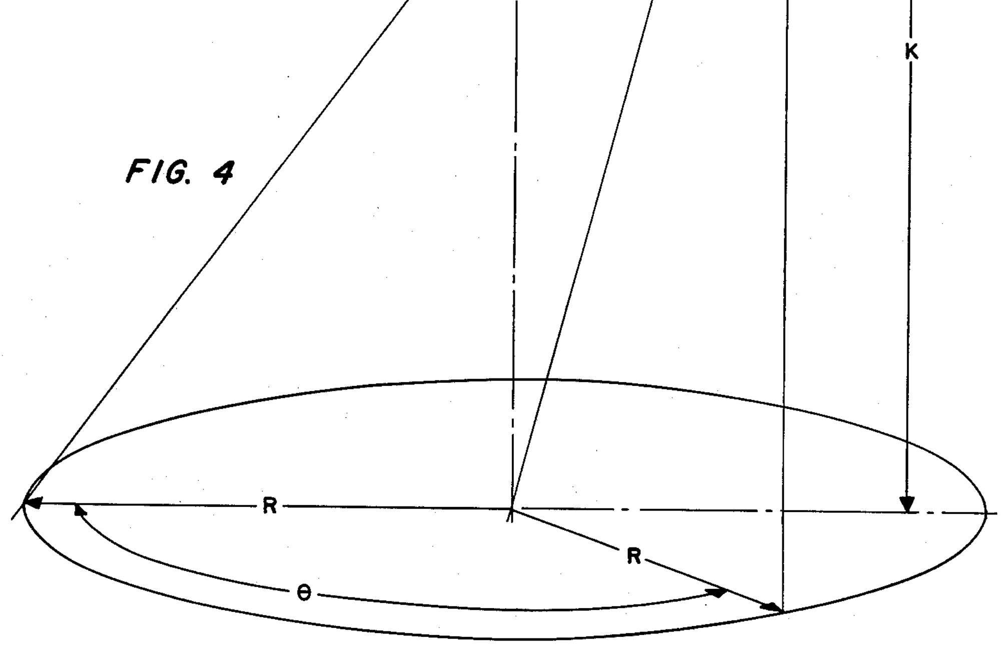

Other objects of this invention will become apparent as the following description of preferred embodiments of the invention proceeds. These embodiments are defined with particularity in the appended claim and are illustrated in the accompanying drawings in which:

FIG. 1 is a perspective view of the screen and projector combination of this invention, FIG. 2 shows by block diagram the projector position controlling circuits of this invention, FIG. 3 shows in section one projector and mounting mechanism of this invention, FIG. 4 shows the geometric relationships involved with a circular screen and an asymmetrically placed projector, FIG. 5 shows one embodiment of drive mechanism for radially and rationally displacing the light beam projector of FIGURES 3 and 4, and FIG. 6 is a perspective view of the projector mountings of FIG. 5.

The target indicator system as viewed by the operator, such as the commanding officer, comprises, as shown in FIG. 1, a vertically disposed screen 1 with either a light reflecting surface commonly known in the motion picture art or a transparent or translucent panel so that light patterns on the panel may be viewed from either side. Normally aimed at the center point of the screen are a plurality of light beam projectors 2 arranged preferably in close spaced relation in a frame 3 spaced from the screen and parallel thereto and centered on the perpendicular center line of the screen. Mechanism to be described individually moves each projector so that its beam of light can independently travel to all points on the screen. Target positional information which the resulting spot represents may be either indicated in rectangular or in polar coordinates. Since optical or radar means which furnishes the target position information measures range in units of distance and bearing in degrees, it is preferred that the plotting on the screen be also in polar coordinates, thus avoiding coordinate transformations. By means of a coordinate or grid projector 4 concentric lines 5 and at least two right angle coordinate lines 6 bisecting the screen at the center may be projected on the screen. Also by means to be described the coordinate lines may revolve about the center to indicate either compass bearing or true north bearing of the home station. Accordingly, a spot of light projected on any point of the screen will indicate azimuth bearing by the angular position of the spot with respect to the right angle coordinate lines and will indicate range by the radial distance of the spot from the intersection of the coordinate lines, usually at or near the center of the screen.

Each projector is mechanically coupled to two independent servo motors, one motor for moving the light beam in a circle on the screen and the second motor for moving the light beam radially from the center is response to target movement. In FIG. 2 is shown the preferred circuitry connected to each motor. Let it be assumed that target locating is done by radar and that the radar antenna 10 has universal movement on its supports. During search phases of operation the antenna may systematically scan all or a segment of the sky, and when a target is located that is to be tracked, the antenna may be made to lock on or follow the target by servo drives, not shown. Let the entire radar system be included in the block 11, the only two voltages of interest here being a voltage, preferably direct current, proportional to range, and a second voltage proportional to azimuth with the compass north being the reference. These two voltages appear, respectively, on lines 12 and 13. Such bearing and range information could of course be obtained with known optical systems. The direct current voltage of line 12 is applied across one resistor 14 and is compared with a second direct current voltage across resistor 15 fed back from the servo motor position indicating potentiometer 16. While there is a difference between the new information voltage from line 12 and the feed back information voltage from potentiometer 16, an error signal activates the modulator 17 to supply, through amplifier 18, to the servo motor 19 alternating current power proportional to the error. The motor continues to run in either of two directions until the error signal is reduced to zero, whereupon the motor stops and holds the mechanically coupled light projector in a fixed position dependent only on the value of the target information signal fed in. The new information pertaining to range of target is fed to the servo motor which is coupled mechanically at 20, FIG. 2, to the radial displacing mechanism of the projector. The displacing mechanism, to be described, is contained in the box 21.

Azimuthal target information on line 13 is fed into a similar system including resistors 22 and 23, modulator 24, amplifier 25, and motor 26, which motor is coupled to the rotary driving mechanism of the projector, box 21, derivation of the error signal at 22 and 23 being obtained from a position potentiometer 27 as in the case of the range servo system. Under the control of the range and bearing voltage information, the projector tube 28 will be directed at any point on the screen 1.

Obviously, only one projector can be physically located on the perpendicular center line of the screen, and all the remaining projectors must be displaced laterally from that center line. In FIG. 3 is shown support mechanism for the projector 28 which will permit universal movement of the projector without distortion of the information projected to the screen. Each projector 28 comprises a collimating tube with a light source 28*a* at the rear end and a pin hole opening 30 at the front end. The tube is mounted upon two spaced panel type supports 31 and 32, each support being pivotally engaged with the tube at spaced points along the tube. The supports are relatively adjustable in position in planes parallel to each other and parallel to the screen. In the embodiment shown in FIG. 3 the first pivot support comprises a roller bearing 33 with an inner circular raceway 34 and an outer spherical raceway 35 with the center of curvature at the center line of the tube. The other pivotal projector support in the embodiment illustrated likewise comprises a ball bearing with a spherical outer raceway 36 for universal free movement. The panel 32 carrying one of the bearings is adjustable in two directions in the plane of the panel. The bearing 33, however, is slidable radially along a slot 37 in panel 31 which panel is a circular disc rotatable in its supports. The geometric relation of the panels may better be comprehended in FIG. 4. With the bearing 33 at the bottom of the slot 37 and the two bearings coaxially aligned, the collimating tube will stand perpendicular to the planes of the support panels. There is thus provided in the mechanism of FIG. 3 means for imparting to the collimating tube the necessary universal movement to indicate on the screen target bearing and target range.

In FIG. 4 is shown in perspective the geometric factors involved in displacing the projector laterally from the center line of the screen. With the tube 28 in the bottom of the slot 37, the support panels are shifted in their own planes until the center line of the tube coincides with the center point of the screen. With the supports thus shifted, it has been found in practice that for a given rotation of the panel with the slot and for a given radial displacement of the tube along the slot, there will be produced a spot of light on the screen in the same position as if the tube had been mounted on the perpendicular center line of the screen. The required amount of shift S of one support with respect to the other, for off-center placement of the projector, depends upon the ratio of the spacing K' between the supports and the distance K to the screen.

The cross-sectional configuration of the pencil of light projected on the screen should be small and well defined for accurately showing the position of the target of the screen. According to an important feature of this invention, however, the cross-sectional shape of the pencil of light may be made distinctive to indicate to the screen observer the nature of the target indicated. For example, silhouettes of bombers, interceptors, and surface craft, or of letters or numerals indicating such targets may be conveniently formed and projected by the beam on the screen. Reticles 38 of various sizes and shapes may be mounted along the periphery of a disc or segment of a disc 39, carried on a pivot 40 parallel to, outside, and mounted on the projector tube 28. The disc should have indexing means, such as notches and spring detents, for positioning the desired reticle in the light beam. The disc may be operated by hand or, alternately, solenoids, not shown, may be remotely operated for rotationally stepping the disc to bring the desired reticle into the light beam. As the target locator to which the projector is operatively connected, as in FIG. 2, moves from one target to another, the appropriate reticle is conveniently stepped into operating position.

In addition to the distinctive shapes of light beams and spots, the beam may be given significant colors. For example, red, yellow, and green may be employed to indicate the relative danger of the target. Color filters 42 likewise may be mounted on a disc 41 to be selectively rotated on pivot 40 into position in the light beam. The second disc 41 may also be stepped by remotely controlled solenoids if desired.

Alternatively, the universal movement of the projector tube may be provided by other supports such as the one shown in FIGURES 5 and 6. The gimbal type support is easy to manufacture, with a minimum of play and backlash. The support forward on the tube is preferably a gimbal with frame 50 and yoke 51. Lateral adjustments parallel to the screen are conveniently made with the slide shown under jibs 52, and with the vertical rod 53. When the tube is pointed straight forward the plane through the four gimbal pivots is parallel to the screen. The gimbal assembly is adjustable rectilinearly parallel to said plane in accordance with the displacement of the projector from the screen center line as explained in connection with FIG. 4.

Polar coordinate information is supplied to the projector tube of the embodiment of FIGURES 5 and 6 by pivotally carrying the rear end of the tube in a journal 54 rotatable and lengthwise slidable on the cylindrical sides of the tube. The journal 54 is in turn supported by pivotal pins 55 on shoes 56 slidable along the guide rods 57. The guide rods are in turn mounted at their ends in cross members 58. The center points of the cross members are pivotly affixed to the ends of the U-shaped yoke 59, the yoke in turn being centered upon and keyed to the rotating shaft 60. In operation, radial deflection of the light beam on the screen is effected by the moving journal 54 along the guide rods. Movement in two directions along the guide rods is effected by coil springs 61 biasing the journal in one direction and by a steel tape 62 drawing the journal in the other direction. The steel tape passes over the pulleys 63 and 64, as shown, and is coupled to the inner race 81 of a bearing in the coupling collar 65. Thus, lengthwise displacement of the steel tape 62 and rotational position of the shaft 60 determines in polar coordinates the position of the light spot on the screen.

One mechanism for driving the projector tube found to be satisfactory in practice is shown in elevation in FIG. 5 and in section and perspective in FIG. 6. The shaft 60 carrying the yoke 59 and the rear end of the beam tube 28 is non-circular in cross-section and extends through the framework including panels 66 and 67, as shown. The shaft is preferably splined or squared as shown and is driven by the motor 26 coupled through gears 68 and 69 directly to the shaft, the rotational position of the shaft throughout 360 degrees being continuously recorded by a servo transmitter comprising the potentiometer 27 as shown in FIGURES 2 and 5. The square shaft rotates freely in ball bearings 70 and 71 in the frame and is accurately fixed against lengthwise motion. Lengthwise displacement of the steel tape 62 is effected by a relatively large and accurately machined lead screw 73. The lead screw is hollow, is coaxially disposed over the square shaft and is freely journaled on the square shaft. Through the gears 74 and 75 the motor drives the lead screw in either direction. Engaging the threads of the lead screw are the threads of the carriage 76 slidably mounted on the lubricating ways or guide rods 77 and 78 parallel to the lead screw. The carriage is rigidly coupled through the push rods 79 and 80 slidable through machined holes in the panel 66 to the collar 65 carrying a ball bearing with inner race 81. The outer race of the bearing is carried on the collar and the inner race is sized and fitted to receive and slide on the square shaft. The end of the steel tape is drawn taut against the springs 61 and then is attached as by a screw to the inner race of the ball bearing.

The longitudinal position of the carriage, which now determines the radial displacement of the rear end of the projector tube, is electrically indicated by a straight-line potentiometer 16 disposed parallel to the lead screw. The potentiometer 16 is shown diagrammatically only in FIG. 5. The wiper on the potentiometer is carried by the carriage so that the voltage between the wiper and one end of the potentiometer is proportional to the lengthwise displacement of the carriage from one end of the lead screw. Hence, the carriage potentiometer 16 and the square shaft potentiometer 27 supplies the two feed back voltages from which the error signals are derived and the range and bearing information of the target is obtained.

So that the spots of light on the screen are at all times properly oriented with respect to the coordinate lines projected on the screen by the grid projector 4, the projector pattern on the screen should revolve about the screen center in accordance with the own ship's compass. For this purpose, a reticle, not shown, with the desired grid pattern is rotatably mounted in the grid projector 4 and is coupled through a servo drive of usual design with the ship's compass. Further, different reticles for various grids, such as for range, closing time, and elevation may be selectively substituted manually or automatically in the projector.

While bearing and range information of each target is presently obtained by a conventional target locator such as radar, the information could be obtained by optical sighting equipment, and the two appropriate voltages applied to resistors 14 and 22, FIG. 2. In either case, the target locator information is applied to the target modulators and amplifiers and hence to the projector servo motors 19 and 26. Hence, each target locator controls directly the position of the beam tube indicator, and the spot of light on the screen faithfully follows the movement of the target. Many modifications in the structural details of the particular embodiment above described may be made, and in fact will be suggested to those skilled in this art, without departing from the invention defined in the appended claim.

What is claimed is:

In combination in a plotting system a screen, a plurality of light beam projectors, each projector comprising a collimating barrel with a light source in said barrel, and a universal mount for said barrel, and a universal bearing means surrounding said barrel at a point remote from said universal mount said bearing means being circularly and radially movable in a plane generally perpendicular to the direction of said universal mount from said bearing means, each projector scanning the screen with a spot of light, an operating circuit, a plurality of radar systems included in said operating circuit and each providing two signal voltage outputs representive, respectively, of two dimensions of a target position located by said systems, a pair of motors included in said operating circuit and mechanically coupled to each projector, one of said motors moving said bearing means circularly and the other motor moving said bearing means radially, a motor position indicating potentiometer for each of said motors and mechanically coupled thereto for feeding back a voltage representative of the position of the respective projectors, matched resistors included in said circuit for comparing each projector position voltage with the corresponding target position voltage, means including an amplifier connected in said operating circuit and to each motor for causing each motor to operate until the projector position voltage and the target position voltage are of equal value, such that said spot of light will travel over said screen in accordance with the position of the target detected by one of said radar systems.

References Cited in the file of this patent

UNITED STATES PATENTS

| | | |
|---|---|---|
| 2,433,860 | McDowell | Jan. 1, 1948 |
| 2,495,296 | Springer | Jan. 24, 1950 |
| 2,581,358 | Busignies et al. | Jan. 8, 1952 |
| 2,622,240 | Fleming-Williams | Dec. 16, 1952 |
| 2,696,947 | Hauser et al. | Dec. 14, 1954 |
| 2,714,199 | Adams et al. | July 26, 1955 |
| 2,782,411 | McNaney | Feb. 19, 1957 |

FOREIGN PATENTS

| | | |
|---|---|---|
| 1,006,416 | France | Jan. 23, 1952 |